UNITED STATES PATENT OFFICE.

JOSHUA KIDD, OF NEW YORK, N. Y.

IMPROVEMENT IN METHODS OF LIGHTING AND HEATING, AND ALSO FOR EXTINGUISHING FIRES.

Specification forming part of Letters Patent No. 122,895, dated January 23, 1872; reissue No. 4,955, dated June 25, 1872.

*To all whom it may concern:*

Be it known that I, JOSHUA KIDD, of the city, county, and State of New York, have invented an Improvement in Method of Lighting and Heating, and also for Extinguishing Fires; and I do hereby declare that the following is a full, clear, and exact description of the construction and operation of the same.

My improvements consist in forcing through pipes the partially-decomposed gases from burning carbonaceous materials; also air heated to 300° and upward of Fahrenheit's scale, by means of the escaping force of a jet of steam or hydrocarbon vapor, for the purpose of preventing condensation of said vapor or steam during its passage through pipes; also in burning the carbonaceous materials in a closed fire-box under a steam-boiler, and using the results of combustion after being forced by a jet of steam through a pipe for heating purposes or for extinguishing fires.

In carrying out my invention I use an apparatus consisting of a vaporizer and a vapor-jet, for which I have had a patent granted to me dated January 10, 1871, No. 110,857. I combine with this arrangement of apparatus a pipe or other arrangement for heating the air. I first heat in a fire a pipe, coiled or otherwise. I attach one end of this pipe to the air-inlet *i*, shown in the aforesaid patent specification, so that atmospheric air is drawn through the heated pipe or from the fire itself, by the escaping force of a jet of vapor, shown at F.

It is the chief and essential feature of my invention that the air be heated to at least double the temperature of the boiling-point of the liquid, with the vapor of which liquid the air has to combine.

The air-heating pipes may be raised to a dull red heat, if desired. I sometimes dispense with the pipes for heating the air, and induce instead the flame of ignited hydrocarbon vapors into the pipe *i* by the escaping force of the vapor-jet E. By this method naphtha and benzine—hitherto of small commercial value—may be vaporized, and after being mixed with burning vapor or air, heated, as above described, may be used for lighting purposes, and forced through pipes without fear of condensation.

Dead or exhaust steam may, in the same way, be superheated, and the mixture of heated air and dead steam forced through pipes by the escaping force of a jet of live steam.

As the purposes of my invention may be accomplished in many different ways, I lay no claim to any special or improved apparatus, except a vaporizer with a vapor-jet for inducing a current of air, as described and set forth in the aforesaid patent specification, combined with a fire of burning carbonaceous matter fixed at *i*, or an arrangement of pipes, fixed in a fire, for heating the air.

Steam or vapor may be generated in any common boiler or other convenient apparatus; but whatever form of vaporizer is used it is essential to combine a jet for inducing heated air or the results of combustion into the vapor.

When my method of generating and mixing air with the same is used for heating purposes or extinguishing fires, I burn coal or other carbonaceous matter in a closed fire-box, and I use the nitrogen and carbonic-acid gas, the results of the combustion, by forcing the same by means of a jet of steam through pipes for heating purposes or extinguishing fires.

No drawing is required with this specification.

When a fire is made to burn at inlet *i* or its equivalent, or any arrangement of pipes for heating air is combined with a vaporizer and air-inducing jet, shown in the drawing attached to the aforesaid patent specification, the apparatus for carrying out my invention is complete, and may be constructed by any skilled workman.

I claim as new—

1. The application of a jet of steam escaping under pressure, when used for the purposes of my invention.

2. The combination of a fire or pipes heated by a fire, with a vaporizer and steam jet or their equivalents, when used for mixing heated air with steam.

3. Heating atmospheric air in a fire from

300° Fahrenheit and upward, and combining the same with steam or hydrocarbon vapor, either separately or combined by induction.

4. The method set forth of sucking the heated results of combustion from a fire by the escaping force of a jet of steam, and using the same for heating purposes and extinguishing fires.

5. I claim combining an adjusted proportion of atmospheric air with hydrocarbon vapors, and forcing the mixture through a red-hot pipe or retort by the aid of an induced current caused by the escaping force of a jet of vapor.

JOSHUA KIDD.

Witnesses:
JAMES KIDD,
ROBERT GROSS.